Jan. 14, 1930.                    C. A. NICKLE                    1,743,797
                              ELECTRICAL REGULATOR
                              Filed Nov. 24, 1926
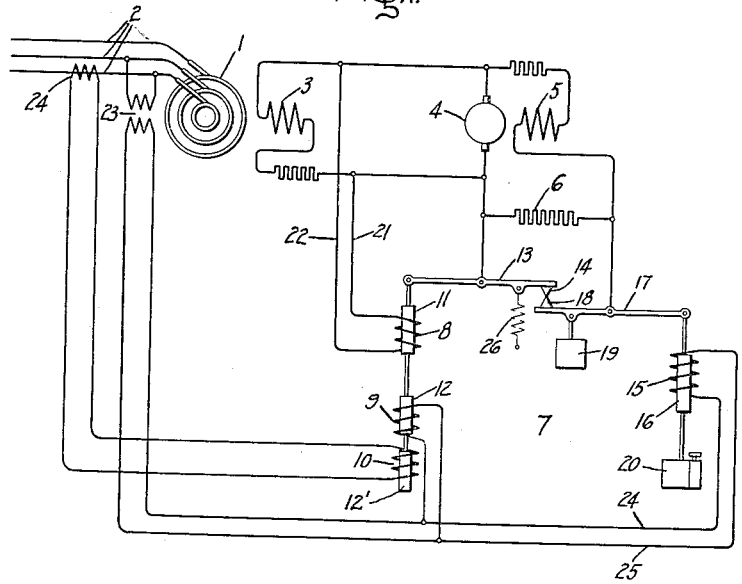
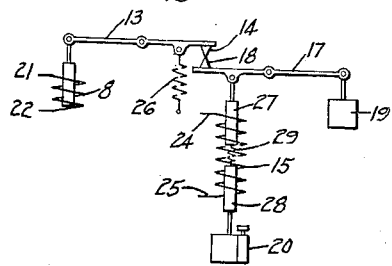
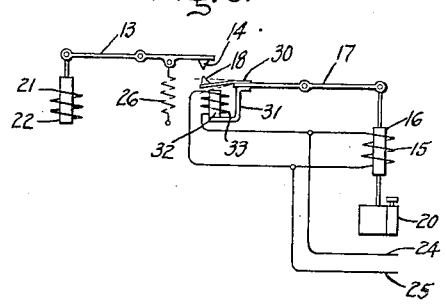
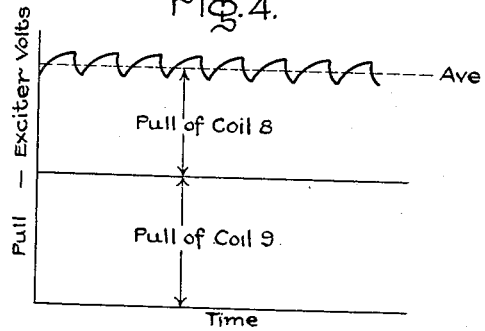
Inventor:
Clifford A. Nickle,
by *Alexander S. [illegible]*
His Attorney.

Patented Jan. 14, 1930

1,743,797

UNITED STATES PATENT OFFICE

CLIFFORD A. NICKLE, OF SCHENECTADY, NEW YORK, ASSIGNOR TO GENERAL ELECTRIC COMPANY, A CORPORATION OF NEW YORK

ELECTRICAL REGULATOR

Application filed November 24, 1926. Serial No. 150,608.

My invention relates to electrical regulators, more particularly to regulators of the vibratory type, and finds particular application in the regulation of synchronous equipment of power transmission systems.

In recent years considerable study has been given to the question of increasing the power transmitting capacity of transmission systems and particularly long distance high voltage systems. In general, the problem is not confined to long distance transmission but has assumed importance in this connection of late years because it is only recently that we are beginning to transmit enough power over important lines to approach their power limits.

In order to facilitate an understanding of the principles involved and the function of the regulator in a system of distribution in which it is desired to improve stability of operation and increase power limits, it seems expedient at the outset to consider briefly some of the factors which determine power limits of synchronous machines and systems of distribution comprising synchronous equipment. The power limit of a system, variously referred to as "maximum power", "limit of stability", "pull out power", etc., may be different depending upon the conditions assumed and the state of operation. The phenomenon of breakdown of a synchronous motor operated from a bus of large capacity is well known. If a load is applied to the shaft of the synchronous motor having a fixed value of excitation, a point is reached at which no more power can be supplied to the motor even though the bus voltage remains constant. The amount of electrical power which can be supplied to the motor depends upon the internal impedance and the motor excitation at the time the load is applied. If the excitation remains constant, at its no load value, breakdown will occur at a much lower load than if the excitation is increased. In a similar manner, if a synchronous generator is used to furnish power to a synchronous motor of the same size and characteristics which is connected to the same bus, and the excitation of each machine corresponds to no load normal voltage then, when the shaft of the synchronous motor is loaded, both machines will drop out of step at a value of load that is approximately one-half of that which either would carry if connected to a bus of the same voltage and of infinite capacity. This is due to the fact that the generator and motor impedances are in series and the effective impedance is twice the value of a single machine. If the motor is gradually loaded, it drops back in phase position with respect to the generator and drops out of step at a definite angle of phase displacement. If a transmission line interconnects the two machines the impedance drop is increased and consequently the angular displacement between the generator and synchronous motor at the same load is also increased. The impedance drop of generator, line and motor add to produce the total displacement between the internal or nominal voltages of the generator and motor. This power limit increases as the field excitations increase and decreases as the impedances increase between the nominal voltages, that is, between the generated or induced voltages of the generator and motor. It will thus be seen that the excitation of the synchronous machines plays an important part in the problem of power limits.

The lower limit of a system is also dependent upon the conditions of operation which are technically referred to as "steady state" and "transient state". Under steady state conditions all forces involved in the entire system are in a state of equilibrium. The power flow is everywhere steady and the excitation on the machines is just that furnished by the exciters. Under transient conditions due to an increment of load the field current is increased due to the current induced in the field by the change of load. It is thus evident that if load is put on with sufficient rapidity to induce a current in the field winding the total excitation will be greater than that furnished by the exciters and the power limit is thereby increased. If the excitations of the synchronous machines have a certain fixed value and the machines are gradually loaded a certain power will be reached at which the machines will break out of synchronism as previously pointed out hereinbefore. For the given excitations the terminal voltage, when the system breaks from synchronism, will have some definite value. When these excitations are of such a value that the terminal voltage at breakdown is the predetermined normal value this power limit is the ultimate maximum steady state limit. A greater excitation will give a greater maximum power transfer but it will occur at a voltage higher than normal. Similarly, a smaller excitation would give a smaller power limit at a terminal voltage less than normal.

As the value of power transfer at normal voltage approaches the ultimate maximum steady state limit there is a decreasing margin between the operating values and the maximum value of power at some lower terminal voltage beyond which the system becomes unstable and breaks out of synchronism. Thus, when operating any system near the ultimate maximum steady state limit, the field current must be promptly increased as the load is increased to hold the terminal voltage at its normal value, and the closer the system load approaches the ultimate maximum steady state limit the more nearly must the increase in excitation occur with the increase in load. Otherwise, upon an increase in load, the system passes immediately to a condition of instability and the synchronous machines drop out of synchronism.

It is, of course, recognized that an increased load can not be thrown on a system instantly. If the load is thrown on a shaft of a synchronous motor, the electrical power to the motor can not increase until the motor drops back in phase which requires a temporary drop in speed. This means that the initial increased demand is partially supplied from the momentum of the rotating parts causing the electrical power supply to increase more gradually, thus lessening the shock on the system. It is to be noted, however, that transient conditions following any change in load cause a system oscillation and an overshoot in power due to the inertia of the rotating apparatus. The period of oscillation of the usual system is of the order of one second which means that the first overshoot in power would usually occur in about one-half second. In this swing the inherent field current rise due to a change in load effects an increase in the field current momentarily and with the usual type of vibratory regulator and properly designed excitation system the voltage to sustain this current may be obtained soon enough to maintain the required excitation and prevent the system from breaking out of synchronism. This condition of operation, however, presupposes a system which is operating below the maximum steady state limit.

Heretofore, as far as I know, there has been no voltage regulator or system of regulation which would permit operation of a transmission system appreciably beyond its maximum steady state limit and under a condition of operation which I term "dynamic stability", because the ultimate value of excitation required for any increase in load could not be attained in a sufficiently short interval of time to prevent the system from breaking out of synchronism. Furthermore, the regulators of the prior art tend to increase the excitation at a time after the system oscillation has started and favor or introduce accumulative hunting so as to increase the tendency of the system to break out of synchronism.

It is an object of my invention to provide an improved regulator for controlling an electrical characteristic, such as the voltage, of a dynamo-electric machine or circuit to be regulated, that shall be effective in restoring said characteristic to a predetermined normal value within a time interval shorter than has been heretofore possible, without introducing instability in the operation of the regulator or circuit to be regulated.

It is a further object of my invention to provide an improved regulator and system of regulation for the synchronous equipment of transmission systems which will increase stability of operation under all operating conditions, and increase the power transmitting capacity of transmission systems beyond the maximum steady state limit, that is, permit operation under dynamic stability.

In order to increase the stability of operation of transmission systems comprising synchronous equipment under all operating conditions and to make possible stable operation when operating near and particularly beyond the steady state limit under dynamic stability, I have found that an automatic regulator of the vibratory type should comprise primary contacts, one or both of which are part of a mechanical system having a high natural oscillating frequency, as compared to the natural oscillating frequency of the system which is being regulated, and the relative position of these primary contacts should be a definite and continuous function of the electrical characteristic which is regulated. This latter requirement means that for any particular value of the characteristic regulated the contacts will have a definite relative position and for some other particular value of the characteristic regulated the contacts will have another definite relative position, and this position will be assumed substantially simultaneously with the change in the characteristic regulated. So far as I know, the present regulators lack either one or the other of the above requirements. In regulators having a potential coil for operating a compression rheostat or for operating rolling or sliding contacts, etc., or with contact-making types of voltmeter regulators, the position of the contacts or movable controlling element thereof may vary as a definite and continuous function of the characteristic regulated but the contacts, or movable elements, are not part of a mechanical system having a high natural oscillating frequency. Furthermore, to overcome friction of rest the deviation of the electrical characteristic from normal must become greater than necessary to maintain the motion of the operating mechanism, and when once started the mechanism overtravels the proper position. This objection has been eliminated to some extent by never allowing the control mechanism to come to rest by arranging it in unstable equilibrium as a "floating system". Various automatic regulators such as regulators of the Tirrill type and other similar types of vibratory regulators operate on this principle, but here the relative position of the contacts of the "floating lever or system" is not a definite and continuous function of the characteristic regulated because the "floating lever", and consequently the contacts operated thereby, can take any position within the range of operation for a predetermined value of voltage. Furthermore, all regulators employing a "floating system" are necessarily damped to prevent overtravel of the floating contact which would otherwise continue to move until the voltage was returned to normal and a balance established. This does not permit the prompt response of the regulator or system of regulation to effect the rapidity of regulation necessary in the type of sytem of distribution under consideration. It is to be noted that the primary contacts of the regulator need not necessarily vibrate at a high frequency, but the mechanical mass of the contact system of which they form a part should bear such a relation to the restoring force that the natural period of oscillation of said contact system is high.

The novel features which I believe to be characteristic of my invention are set forth with particularity in the appended claims, the invention itself, however, both as to organization and method of operation together with further objects and advantages thereof will best be understood by reference to the following description taken in connection with the accompanying drawing in which Fig. 1 is a diagrammatic illustration of a regulator and system of regulation embodying my invention; Figs. 2 and 3 illustrate a modified embodiment of the regulator in a portion of the system shown in Fig. 1; and Fig. 4 is an explanatory diagram showing the pull characteristics for one of the movable members actuating the contacts of the embodiment shown in Fig. 1.

A system in connection with which the present invention may be conveniently employed is shown in Fig. 1 which comprises a synchronous dynamo-electric machine shown as a three-phase alternator 1 that is connected to a distribution system 2. The alternator 1 is provided with a field winding 3 which is supplied with an exciting current from a source of direct current shown as a dynamo-electric machine or exciter 4. The exciter is provided with a field winding 5 which is preferably shunt excited as shown, although it may be excited from any suitable source of direct current. In series with the field winding 5 is placed a resistor 6 which is adapted to be periodically shunted by the operation of the cooperating contacts of an automatic regulator 7. The exciter 4 and excitation system should preferably be one with a low time constant in order to have the regulator operate most effectively. Regulator 7, as here shown, is of the Tirrill type. It is to be understood, however, that my invention may be embodied in other types of regulators as well as other types of vibratory regulators such as are shown in Letters Patent No. 1,147,576 to Tirrill, No. 1,215,360 to Fuss and similar types of regulators in which the regulation is accomplished through the agency of cooperating contacts having relatively rapid vibratory motion and capable of assuming variable relative positions to vary the mean effective excitation of a dynamo-electric machine in order to maintain an electrical characteristic of the dynamo-electric machine at a predetermined value under various operating conditions.

Regulator 7 in the form shown comprises two main parts. At the left hand side there is an electromagnetic means comprising solenoids 8, 9 and 10 for actuating plungers 11 and 12, and 12', which are mechanically connected together and also connected to a pivoted lever 13 carrying a contact 14. At the right hand side there is an electromagnetic means comprising solenoid 15 for actuating a plunger 16 which is connected to a pivoted lever 17 carrying a contact 18. The plunger 16 is balanced by suitable means such as a balance weight 19, and its motion is damped by means of a dash-pot 20. The solenoid 8 is connected by means of conductors 21 and 22 to the excitation circuit so that the current therethrough is proportional at any time to the voltage of exciter 4. Solenoid 9 is connected by means of a potential transformer 23 through conductors 24 and 25 to be responsive to the voltage of alternator 1, and solenoid 10 is connected by means of a current transformer 24 to be responsive to the current delivered by alternator 1. Solenoid 9 acts to assist solenoid 8 while solenoid 10 acts to oppose the pull of solenoids 8 and 9 to actuate plungers 11 and 12 and thereby lever 13. The pull of these solenoids on the left hand end of lever 13 is opposed by a single spring 26 on the right hand end, but in practice there are usually a plurality of springs in multiple which are arranged so that the combined torque of these springs varies approximately according to the same law as the electromagnetic attractive force.

In order that my invention may be readily and clearly understood, it seems desirable to examine in some detail the operation of regulators of the vibratory type comprising a simple direct current system comprising solenoid 8 and its associated plunger 11 and operating lever 13 and an alternating current system comprising solenoid 15 and its associated plunger 16 and operating lever 17. The pivoted lever 17 carries the plunger 16 which is retarded in its motion in order to make the regulator stable. Solenoid 15 which is connected to the source of voltage to be regulated exerts an upward pull on the plunger 16 while the weight 19 is so adjusted that this lever system is exactly balanced when the voltage impressed on solenoid 15 is the value which is to be maintained. For this predetermined value of voltage the lever 17 is preferably balanced in any position. Pivoted lever 13 is subjected to a downward pull on the left hand end by the attraction of solenoid 8 and this pull is opposed by the spring 26. Contacts 14 and 18 which are operated by pivoted levers 13 and 17 respectively are arranged to short circuit or insert resistance in the exciter field circuit. For simplicity of illustration, these contacts are shown as operating directly across the resistor 6 but the well known intermediate relay which is controlled by these primary contacts would no doubt be used in practice.

Consider the sequence of events for a fixed position of lever 17. If the exciter voltage is initially zero the pull of coil 8 will be zero and the spring 26 having no opposition will close the contacts 14 and 18 thereby short circuiting resistor 6 in the exciter field circuit. This will cause the exciter voltage to build up gradually increasing the pull of coil 8. After a certain time the exciter voltage will become great enough to make the pull of coil 8 greater than the pull of spring 26, thereby opening the contacts. This inserts resistance 6 in the exciter field circuit and the exciter voltage starts to fall. When it has fallen to a certain value the pull of coil 8 is again less than the pull of spring 26 and the contacts close again. They will remain closed until the pull of coil 8 is again greater than the pull of spring 26. Thus for a fixed position of lever 17 the exciter voltage will periodically vary between two values and a certain average value will be obtained.

In Fig. 4 the upper curve represents the form of the exciter voltage as plotted between volts as ordinates and time as abscissæ. The dotted line through the varying exciter voltage curve represents the average exciter voltage for a given load condition.

The average exciter voltage thus held will cause a certain voltage to exist at the alternator terminals. If this voltage is the proper value to balance lever 17, it will stay in the assumed position and operation will continue in the manner hereinbefore described. If for the assumed position of lever 17, the average exciter voltage is not great enough to produce an alternator voltage sufficient to effect a balance, the left end will gradually rise to a new position, the time to reach the new position being controlled by the dashpot 20. As the lever 17 thus moves the spring 26 must be stretched more before the contacts 17 and 18 can open and this requires more pull by solenoid 8 which means a greater exciter voltage. The contacts will also close at a greater exciter voltage than for the initial position of the lever. The average exciter voltage necessary for a periodic opening and closing of the contacts thus becomes greater as the left end of lever 17 rises. As this average exciter voltage increases the voltage of the alternator and the pull of solenoid 15 increases. When the exciter voltage has increased so that normal voltage is obtained on the alternator the lever 17 is balanced and remains in this position. In order that the regulator may be stable, the dashpot must exert considerable damping. If this damping is too small, lever 17 will follow variations in the alternator voltage faster than they can be corrected by the excitation system and sustained voltage oscillations will occur. The damping required to make the regulator stable makes its action sluggish and considerable time elapses after a change in voltage before lever 17 assumes its final position and corrects the voltage. Thus for a few moments after a change in alternator voltage the position of lever 17 is sensibly constant and the exciter voltage is also sensibly constant only obtaining its correct value in a gradual manner.

In order to make the regulator more rapidly responsive to alternator changes without introducing instability, the modification shown in Fig. 1 which comprises an additional plunger 12 and solenoid 9 acting on lever 13 has been found very effective. The solenoid 9 which is connected to be responsive to the alternator voltage is arranged to pull downward on the left end of lever 13. As before, the lever 17 at any instant is sensibly constant in any position. The total pull on lever 13 must be of a certain magnitude to open the contacts and of another definite magnitude to close the contacts. This total pull is now made up of two parts, that due to the alternating current in coil 9 and the direct current in coil 8. The component of pull produced by coil 8 is due to the exciter voltage. Since the pull of solenoid 8 varies approximately as the square of the exciter voltage which has an exponential increase and decrease, the pull characteristic curve will have the same general shape and for convenience the voltage curve is used to illustrate also the pull characteristic of solenoid 8. Hence the total pull on the left hand end of lever 13 for a given load condition may be represented by the sum of the pulls of solenoids 8 and 9. If the lever 17 is in such a position that with a predetermined normal alternator voltage the total pull on lever 13 required to open and close the contacts periodically requires an average exciter voltage which is just great enough to maintain normal alternator voltage, the regulator is in equilibrium and lever 17 will remain in this position. If a decrease in alternator voltage now occurs, lever 17 does not change its position appreciably during the first few moments but the pull of coil 9 instantly decreases and the total pull of lever 13 is no longer sufficient to open the contacts, a cessation of the normal vibratory action occurs and the exciter voltage immediately starts to build up to an increased average value such that the total pull is again the same as before the drop in alternator voltage. Thus, the exciter voltage is increased to a new average value in one vibration of the contacts.

The arrangement may be further modified by the addition of a plunger 12' and its solenoid 10 which is connected to be responsive to the load current of the alternator and arranged to act in opposition to solenoids 8 and 9. An increase in load will permit a rapid compounding effect since the increase in current will decrease the combined pull due to solenoids 8 and 9 along with the decrease in pull occasioned by the decrease in alternator voltage.

Fig. 2 illustrates another modification of the invention and shows how the principle involved in this improved regulator and system of regulation may be carried out by modifying the characteristics of the so-called alternating current or "floating lever system". For simplicity of illustration I have simply shown a portion of the system shown in Fig. 1 but the manner in which the solenoids are connected will be evident since like numerals have been used for the conductors from the terminals of the solenoids as well as for similar members of the regulator. In this modification the lever 13 and the elements associated therewith may be the same as the usual type of Tirrill regulator such as is shown in Fig. 1 with the plungers 12 and 12', and the actuating solenoids 9 and 10 omitted. The lever system comprising lever 17, however, is modified to the extent that the balance weight 19 is moved from the left hand end to the right hand end while the actuating mechanism is moved to the left hand end. The actuating mechanism comprises two plungers 27 and 28 which are connected together by means of a spring 29. The upper member of this combination is connected to the lever 17 while the lower member is provided with a dash-pot 20. The actuating solenoid is the coil 15 which is connected through conductors 24 and 25 to be responsive to the voltage of the alternator.

The operation of the lever 13 and its associated parts will be the same as previously described in connection with the preliminary discussion of the usual embodiment of a Tirrill type regulator. For a predetermined normal voltage the solenoid 15 will pull plungers 27 and 28 together against the force of the spring 29 and the motion of the combined unit above this value will be damped in the usual manner by the dash-pot 20. Now assume the alternator voltage decreases below the predetermined value that maintains spring 29 compressed. The plunger 28 cannot move instantly but the plunger 27 will be immediately snapped up by the spring to close the contacts. The alternator excitation is thereby increased to a new average value in one vibration of the contacts as was similarly effected by the arrangement shown in Fig. 1.

Fig. 3 illustrates another modification which may be applied to the usual arrangement of a Tirrill type of regulator or to a vibratory regulator with one fixed contact on a plate spring. In this case the lever system and main actuating coils are the same in position and arrangement as shown in Fig. 1 with plunger 12 and its actuating solenoids omitted. Here, however, the contact 18 is mounted on a plate spring 30 which is suitably fastened to the left end of lever 17. A suitable bracket 31 is also positioned at the same end of lever 17 in such a manner as to support a core 32 and its solenoid 33 in an operative position to deflect plate spring 30 and its contact 18 away from contact 14 a predetermined distance when energized a predetermined amount. The solenoid 33 is connected to be responsive to the alternator voltage and, as shown, is connected in parallel with the main operating solenoid 15 which may be connected by means of conductors 24 and 25 to the alternator mains as shown in Fig. 1. This lever system is balanced as in the other modifications and if the core 32 and solenoid 33 are too great in weight to balance plunger 16, the proper adjustment may be readily made by using the necessary balancing weights.

The operation of the arrangement for normal voltage conditions will be essentially the same as for the previous modification. The contact 18 is biased to a given position for a predetermined normal alternator voltage. The lever 17 will assume various positions for a variation from the predetermined normal voltage, while lever 13 will vibrate contact 14 in a manner to maintain the proper exciter voltage to maintain the alternator voltage at the predetermined value. Now assume the alternator voltage decreases below the predetermined value. Plunger 16, and consequently lever 17, is sensibly fixed in position for a short interval. The pull of solenoid 32, however, is immediately decreased and contact 18 is immediately snapped to a new position and closes contacts 14 and 18 independently of the position assumed by lever 17. The alternator excitation is thereby increased to the new average value in one vibration of the contacts.

While I have shown several modifications of my invention, it will be apparent that other modifications and changes may be made by those skilled in the art in the type of regulator shown, as well as in other types of regulators without departing from my invention and I, therefore, aim in the appended claims to cover all such changes and modifications as fall within the true spirit and scope of my invention.

What I claim as new and desire to secure by Letters Patent of the United States, is as follows:—

1. In a system of distribution, a dynamo-electric machine, an excitation circuit therefor, an electrical regulator comprising a pair of cooperating contacts for controlling said excitation circuit to control an electrical characteristic of said dynamo-electric machine, said contacts being part of a mechanical system of high natural oscillating frequency as compared to the natural oscillating frequency of said system, and means for varying the position of one of said contacts substantially simultaneously with a deviation from a predetermined value of the electrical characteristic regulated to effect a new average value of excitation for said dynamo-electric machine which shall be a substantially definite and continuous function of the electrical characteristic regulated.

2. In a system of distribution, a synchronous dynamo-electric machine, an excitation circuit therefor, an electrical vibratory regulator comprising a pair of cooperating contacts for controlling the voltage of said synchronous machine, said contacts being part of a mechanical system of high natural oscillating frequency as compared to the natural oscillating frequency of said system, and means for varying the position of one of said contacts substantially simultaneously with a deviation in the voltage regulated from a predetermined normal value to effect a new average value of excitation for said dynamo-electric machine which shall be a substantially definite and continuous function of the voltage regulated.

3. In a system of distribution, a dynamo-electric machine, an electrical regulator comprising a pair of normally vibrating cooperating contacts for controlling an electrical characteristic of said dynamo-electric machine, said contacts being part of a mechanical system of high natural oscillating frequency as compared to the natural oscillating frequency of said system, means for varying the relative position of said contacts, and means responsive substantially simultaneously with a change in the electrical characteristic regulated for effecting independently of said first mentioned means a condition of non-vibratory action between said contacts during a substantial portion of the duration of said change for permitting operation of said system above the maximum steady state power limit.

4. In a system of distribution, a synchronous dynamo-electric machine, an electrical vibratory regulator comprising a pair of cooperating contacts for controlling the voltage of said synchronous machine, said contacts being part of a mechanical system of high natural oscillating frequency as compared to the natural oscillating frequency of said system, means for varying the relative position of said contacts, and means responsive substantially simultaneously with a change in the voltage regulated for effecting independently of said first mentioned means an uninterrupted engagement between said contacts during a substantial portion of the duration of said change for permitting operation of said system above the maximum steady state power limit.

5. An electrical regulator comprising cooperating contacts, means responsive to an electrical characteristic regulated for varying the relative position of said contacts, and means responsive to the electrical characteristic regulated for varying the relative position of said contacts in a different time interval than said first mentioned means for a predetermined condition of the electrical characteristic regulated.

6. An electrical regulator comprising cooperating contact members, means responsive to an electrical characteristic regulated for varying the relative position of said contacts, and means responsive to the electrical characteristic regulated for varying the relative position of said contacts in a shorter time interval than said first mentioned means when said electrical characteristic deviates from a predetermined normal value.

7. An electrical regulator comprising cooperating contact members, means for effecting a vibratory movement of one of said contact members, means for varying the relative position of said contact members, and means for effecting a change in the relative position of said contact members substantially simultaneously with a change in the electrical characteristic regulated from a predetermined normal value.

8. The combination of a dynamo-electric machine, an exciter therefor, and a regulator having two cooperating contacts for varying an electrical characteristic of said exciter, means responsive to an electrical characteristic of said exciter for vibrating one of said contacts, means responsive to an electrical characteristic of said machine for varying the relative position of said contacts, and means for effecting a relative position of said contacts which shall be a definite function of the characteristic regulated substantially simultaneously with a deviation of said electrical characteristic from a predetermined value.

9. An electrical regulator comprising cooperating contact members for controlling an electrical characteristic of an electrical circuit, means for vibrating one of said contact members, means for varying the relative position of said contact members, and means for effecting substantially simultaneously with a change in the characteristic regulated a new relative position of said contact members independently of said second mentioned means and a cessation of said normal vibratory action during the deviation of said electrical characteristic from a predetermined normal value.

10. An electrical regulator comprising cooperating contact members for controlling an electrical characteristic of an electrical circuit, a movable member for actuating one of said contact members, and a plurality of windings for actuating said movable member, one of said windings being arranged to produce vibratory action of said contact member and another of said windings being arranged for effecting substantially simultaneously with a change in the characteristic regulated a change in the relative position of said contacts and a cessation of said normal vibratory action during any deviation of said electrical characteristic from a predetermined value.

11. In combination, a dynamo-electric machine, an excitation circuit therefor, a vibratory regulator comprising cooperating contacts normally rapidly vibrated for varying a mean effective value of an excitation characteristic of said dynamo-electric machine to maintain an electrical characteristic of the machine at a predetermined value, and means for effecting a new mean effective value of said excitation characteristic in one vibration of said contacts substantially simultaneously with a change of the electrical characteristic regulated from said predetermined value.

12. In combination, a dynamo-electric machine, an excitation circuit therefor, a vibratory regulator comprising cooperating contacts normally rapidly vibrated for varying a mean effective value of the voltage impressed upon the excitation circuit of said dynamo-electric machine to maintain the voltage of said dynamo-electric machine at a predetermined value, and means responsive to the voltage regulated for effecting a new mean effective value of said excitation voltage in one vibration of said contacts substantially simultaneously with a deviation in the voltage of said dynamo-electric machine from said predetermined value.

13. A vibratory regulator comprising cooperating movable contacts for controlling an electrical characteristic of a dynamo-electric machine by varying an excitation characteristic thereof, means responsive to the electrical charactertistic to be regulated for actuating one of said contacts, and means responsive to both the excitation characteristic and the electrical characteristic to be regulated for actuating the other of said contacts.

14. A vibratory regulator comprising cooperating movable contacts for controlling the voltage of a dynamo-electric machine by varying the excitation voltage thereof, means responsive to the voltage regulated for varying the position of one of said contacts, and means responsive to both the excitation voltage and the voltage to be regulated for vibrating and varying the relative position of the other of said contacts.

15. The combination with a synchronous alternating current machine, an excitation circuit therefor, a lever system having cooperating contacts for controlling said excitation circuit, an electromagnet responsive to the voltage of said excitation circuit and an electromagnet responsive to the voltage of said synchronous machine for actuating one contact of said lever system, and an electromagnet responsive to the voltage of said synchronous machine for actuating the other contact of said lever system.

16. The combination with a dynamo-electric machine having an excitation circuit, a lever system having cooperating contacts for controlling said excitation circuit, an electro-magnet responsive to an electrical characteristic of said excitation circuit and an electromagnet responsive to an electrical characteristic of said dynamo-electric machine for actuating one contact of said lever system, and a control electromagnet responsive to an electrical characteristic of said dynamo-electric machine for actuating the other contact of said lever system.

17. In a system of distribution, a synchronous dynamo-electric machine, an excitation circuit therefor, means comprising a vibratory regulator having cooperating contacts for controlling an electrical characteristic of said excitation circuit, and means associated with one of said contacts for effecting a prolonged predetermined position of said contacts until an electrical characteristic of said excitation circuit has an average value sufficient to maintain an electrical characteristic of said synchronous machine substantially at a predetermined value.

18. In a regulating system, a synchronous alternating current machine, an exciter therefor, a pair of cooperating contacts arranged to control by their engagement and disengagement the excitation of said exciter, means for effecting a vibratory action between said contacts, means responsive to an electrical characteristic of said alternating current machine for controlling the relative position of said contacts, and additional means for controlling the relative position of said contacts independently of the position effected by said second mentioned means and substantially simultaneously with a deviation of an electrical characteristic of said synchronous machine from a predetermined value.

19. The combination of a synchronous dynamo-electric machine, an excitation circuit therefor, a resistance in said excitation circuit, a regulator comprising cooperating contact members for controlling the effective value of the resistance in said excitation circuit, means responsive to a characteristic of said excitation circuit for vibrating one of said contacts, means responsive to an electrical characteristic of said synchronous dynamo-electric machine for varying the relative position of said contacts, and additional means for varying the position of said contacts independently of the position effected by said second mentioned means and substantially simultaneously with a deviation in an electrical characteristic of said synchronous dynamo-electric machine from a predetermined value.

20. In a regulating system, a synchronous alternating current machine, an exciter therefor, a pair of cooperating contacts arranged to control by their engagement and disengagement the excitation of said exciter, means responsive to the voltage of said exciter for effecting vibratory action between said contacts, means responsive to the voltage of said synchronous alternating curent machine for controlling the relative position of said contacts, and additional means responsive to the voltage of said synchronous alternating current machine for controlling the position of said contacts independently of the position effected by said second mentioned means and substantially simultaneously with a change in the voltage of said synchronous machine from a predetermined value.

21. In a regulating system, a synchronous alternating current machine, an exciter therefor, a pair of cooperating contacts arranged to control by their engagement and disengagement the excitation of said exciter, movable members for carrying said contacts, means operative in response to an electrical characteristic of said exciter for vibrating one of said movable members, means operative in response to an electrical characteristic of said synchronous machine for varying the position of the other of said movable members, and means for controlling under predetermined conditions the relative position of said contacts independently of the position of said second mentioned movable member.

22. In a regulating system, a synchronous alternating current machine, an exciter therefor, a pair of cooperating contacts arranged to effect by their engagement an increase in the excitation of said exciter and by their disengagement a decrease in the excitation of said exciter, a winding responsive to the voltage of said exciter for effecting vibratory action between said contacts, a winding responsive to the voltage of said synchronous alternating current machine for controlling the relative position of said contacts, and an additional winding assisting the action of said first winding and responsive to the voltage of said synchronous alternating current machine for effecting a change in the relative position of said contacts independently of the relative position effected by said second mentioned winding and substantially simultaneously with a deviation of the voltage of said synchronous machine from a predetermined value.

23. In a regulating system, a synchronous alternating current machine, an exciter therefor, a pair of cooperating contacts arranged to effect by their engagement an increase in the excitation of said exciter and by their disengagement a decrease in the excitation of said exciter, a winding responsive to the voltage of said exciter for effecting vibratory action between said contacts, a winding responsive to the voltage of said synchronous alternating current machine for controlling the relative position of said contacts, and an additional winding opposing the action of said first winding and responsive to the current of said synchronous alternating current machine for effecting a change in the relative position of said contacts independently of the relative position effected by said second mentioned winding and substantially simultaneously with a change in the current of said synchronous machine.

24. In a regulating system, a synchronous alternating current machine, an exciter therefor, a pair of cooperating contacts arranged to effect by their engagement an increase in the excitation of said exciter and by their disengagement a decrease in the excitation of said exciter, a winding responsive to the voltage of said exciter for effecting vibratory action between said contacts, a winding responsive to the voltage of said synchronous alternating current machine for controlling the relative position of said contacts, and two windings responsive respectively to the voltage and current of said synchronous alternating current machine and acting respectively to assist and oppose the action of said first winding for effecting a change in the relative position of said contacts independently of the relative position effected by said second mentioned winding and substantially simultaneously with a change in the voltage and current of said synchronous machine.

25. In a system of distribution, a dynamo-electric machine, an electrical regulator therefor comprising cooperating contact members for controlling an electrical characteristic thereof, means for normally vibrating one of said contact members, means for varying the relative position of said contact members, and means for causing a cessation of the normal vibratory action of said contacts substantially simultaneously with any deviation of said electrical characteristic from a predetermined normal value for a period of time sufficient to restore said regulated characteristic to said predetermined normal value.

26. A step in the method of operating under dynamic stability an alternating current transmission system including synchronous machines, which consists in increasing and decreasing the excitation voltage of a synchronous machine upon the occurrence of terminal voltage variations substantially in time-phase with the decrease and increase of said terminal voltage variations and with the magnitude of the excitation voltage varying as a function of said terminal voltage so that the flux linkages in said synchronous machine are maintained substantially constant.

27. In a system of distribution, a dynamo-electric machine having a field winding, means for energizing said field winding, and means responsive to the voltage of said dynamo-electric machine for changing the voltage impressed upon said field winding from a given value to another definite value in accordance with the magnitude of a change in the voltage of said dynamo-electric machine and at the maximum available rate of change of voltage of said energizing means.

28. In a system of distribution, a synchronous dynamo-electric machine, a field winding therefor, a direct current dynamo-electric machine connected to energize said field winding, and means including a regulator having vibratory contacts for maintaining an average predetermined voltage upon said field winding for a predetermined voltage in said system of distribution and for effecting a change from said predetermined average voltage to another definite average value in accordance with the magnitude of a change in the voltage of said system and at the inherent maximum rate of voltage change of said direct current machine.

In witness whereof, I have hereto set my hand this 23d day of November, 1926.

CLIFFORD A. NICKLE.